United States Patent [19]
Oshiki et al.

[11] 4,438,471
[45] Mar. 20, 1984

[54] MAGNETIC HEAD FOR PERPENDICULAR MAGNETIC RECORDING SYSTEM

[75] Inventors: Mitsumasa Oshiki, Yokohama; Susumu Kawakami, Tama, both of Japan

[73] Assignee: Fujitsu Limited, Kawasaki, Japan

[21] Appl. No.: 213,406

[22] Filed: Dec. 5, 1980

[30] Foreign Application Priority Data

Dec. 13, 1979 [JP] Japan .................. 54-162324

[51] Int. Cl.³ .................. G11B 5/14; G11B 5/20
[52] U.S. Cl. .................. 360/125; 360/123
[58] Field of Search .............. 360/126, 123, 125, 119

[56] References Cited

U.S. PATENT DOCUMENTS

| | | | |
|---|---|---|---|
| 2,185,300 | 1/1940 | Hickman | 360/125 |
| 2,920,379 | 1/1960 | Hagopian | 360/125 |
| 3,120,001 | 1/1964 | Supernowicz | 360/125 |
| 3,230,517 | 1/1966 | Supernowicz | 360/123 |
| 3,601,871 | 8/1971 | Pierce | 360/123 |
| 3,881,192 | 4/1975 | Ballinger | 360/123 |

*Primary Examiner*—Robert S. Tupper
*Attorney, Agent, or Firm*—Staas & Halsey

[57] ABSTRACT

A magnetic head for perpendicular magnetic recording system which assures low write current and high recording reproduction efficiency by using a flat coil and increasing the number of turns of the coil. The flat coil is formed on a substrate and a main pole piece is arranged in the center of the coil and vertically to the surface on which the coil is formed. This magnetic head is suitable particularly for manufacture as a thin film magnetic head.

16 Claims, 16 Drawing Figures

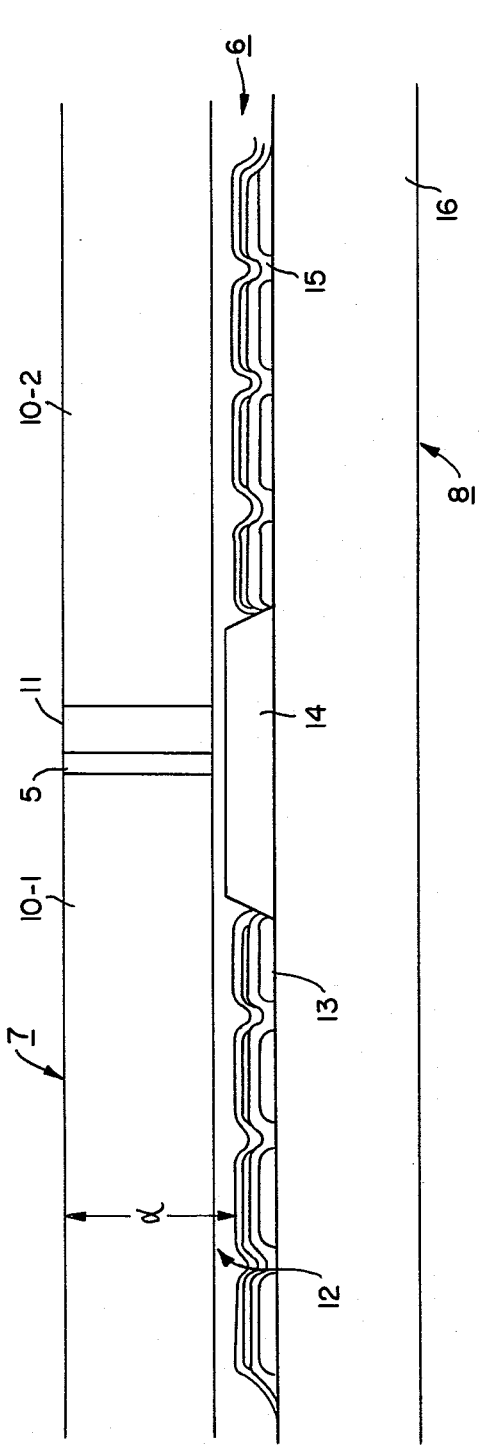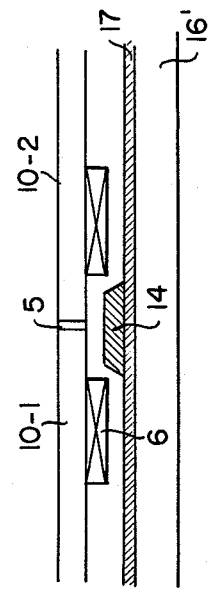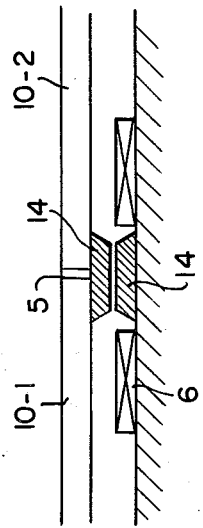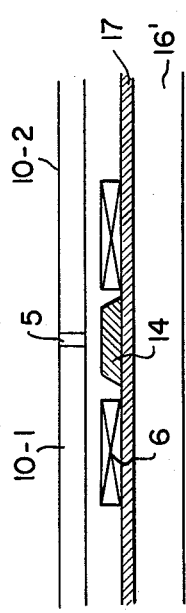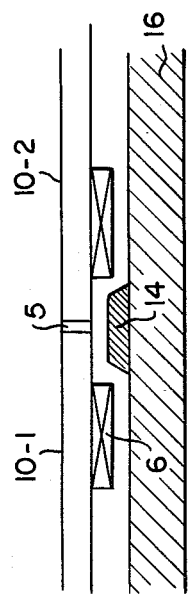
FIG. 4.
FIG. 7.
FIG. 9.
FIG. 8.
FIG. 10.

MAGNETIC HEAD FOR PERPENDICULAR MAGNETIC RECORDING SYSTEM

FIELD OF THE INVENTION

This invention relates to a magnetic head for perpendicular magnetic recording systems which is suitable for manufacture as a thin film magnetic head and which increases the recording/reproduction efficiency by providing a flat coil on a substrate and a main pole piece at the center of said coil in order to allow the magnetic flux of the magnetic field generated by said coil to flow vertically to the surface on which said coil is formed.

BACKGROUND OF THE INVENTION

As is well known, magnetic recording methods are classified generally into two kinds of modes. The first one is a recording mode utilizing the longitudinal residual magnetization to the surface of the recording medium, while the other is a mode utilizing the perpendicular residual magnetization. The former longitudinal magnetic recording method has long been employed, but investigation and development of the latter perpendicular magnetic recording mode have been widely continued because this latter method provides higher recording density as compared with the longitudinal recording method.

As to this perpendicular recording mode, the systems as indicated in FIG. 1 and FIG. 2 are currently known.

Namely, known is the perpendicular magnetic recording system comprising a magnetic head obtained by providing a main pole piece 2, as indicated in FIG. 1, perpendicular to the magnetic recording medium, where the Co-Cr alloy film having the magnetic anisotropy in the perpendicular direction is provided on a plastic or aluminium base material 3, and by forming a coil 1' around said main pole piece 2.

This recording system is generally called the main pole excitation system. Also known is the perpendicular magnetic recording system having a magnetic head, as indicated in FIG. 2, where the main pole piece 2 and the auxiliary pole piece 4 are provided perpendicular to the magnetic recording medium as indicated in FIG. 1 mutually facing the medium and a coil 1' is formed around the auxiliary pole piece 4. This system is generally called the auxiliary pole excitation system. In such perpendicular magnetic recording systems, the perpendicular magnetic recording is carried out as indicated in FIGS. 1 and 2 on the recording medium by exciting the coil 1' of the magnetic head.

Such perpendicular recording systems, however, have the disadvantages as explained below.

Namely, in the perpendicular recording system employing the main pole excitation method indicated in FIG. 1, this main pole piece 2 itself determines the recording density of the medium and is designed in a very small size. Therefore, it is difficult to form a coil having a large number of turns to said main pole piece 2, and resultingly it cannot generate an intensified magnetic field.

In addition, since the coil is formed around this main pole piece 2, it cannot be formed in a large size because it would be difficult to generate a sharp magnetic field for the recording medium.

Moreover, a thin film magnetic head has been employed recently in order to miniaturize the magnetic head, but if formation of such a magnetic head using a thin film head is attempted, formation of the coil will become difficult and the manufacturing processes will also be complicated.

On the other hand, in the case of the auxiliary pole excitation system indicated in FIG. 2, recording is carried out on the recording medium by concentrating the magnetic flux generated by the auxiliary pole 4 to the main pole 2. The recording efficiency is rather bad, however, because the magnetic film of the recording medium 1 and the magnetic field generation position are apart. Moreover, the coil 1' has a large inductance and it is difficult to drive such a magnetic head at a high speed.

Since the main pole 2 and the auxiliary pole 4 are provided face to face on both sides of the recording medium, this system also cannot be used for magnetic recording systems using a thick substrate recording medium, such as a magnetic disk unit.

OBJECTS AND SUMMARY OF THE INVENTION

An object of this invention is to offer a magnetic head to be used for the perpendicular recording system of the main pole excitation type, where the number of turns of the coil in the main pole excitation system can be increased and such head can be manufactured easily as a thin film magnetic head by forming a flat coil on a substrate and forming the main pole vertically to the surface where said coil is formed and at the center of said flat coil. According to this invention, a magnetic head comprises a flat coil formed on a substrate and a main pole piece formed at the center of said coil vertical to the surface where said coil is formed, and wherein said substrate, coil and main pole piece are integrated into one unit.

Further features and advantages of the present invention will be apparent from the ensuring description with reference to the accompanying drawings to which, however, the scope of the invention is in no way limited.

BRIEF DESCRIPTION OF THE DRAWINGS

FIG. 4 is an enlarged cross section of the embodiment of the magnetic head for perpendicular magnetic recording of the present invention indicated in FIG. 3.

FIG. 7 shows another embodiment of the magnetic head for the perpendicular magnetic recording system of the present invention having a ferromagnetic thin film formed on a nonmagnetic substrate on which the flat coil is positioned.

FIG. 8 shows still another embodiment of the magnetic head for the perpendicular magnetic recording system of the present invention having the flat coil formed on the substrate containing the main pole and the magnetic core formed on an opposing ferromagnetic substrate.

FIG. 9 shows still another embodiment of the magnetic head for the perpendicular magnetic recording system of the present invention having the flat coil formed on the substrate containing the main pole and the magnetic core formed on an opposing composite substrate of a ferromagnetic thin film and a nonmagnetic substrate.

FIG. 10 shows still another embodiment of the magnetic head for the perpendicular magnetic recording system of the present invention having a magnetic core formed on the main pole substrate and a magnetic core formed on the coil substrate.

DETAILED EXPLANATION OF THE INVENTION

Figure 1:
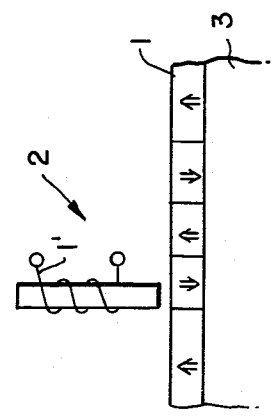
FIG. 1 explains a magnetic head for conventional perpendicular magnetic recording systems of the main pole excitation type.
Figure 2:
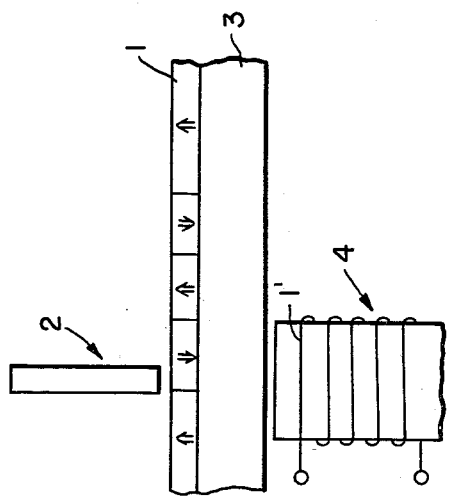
FIG. 2 explains a magnetic head for conventional perpendicular magnetic recording systems of the auxiliary pole excitation type.
Figure 3:
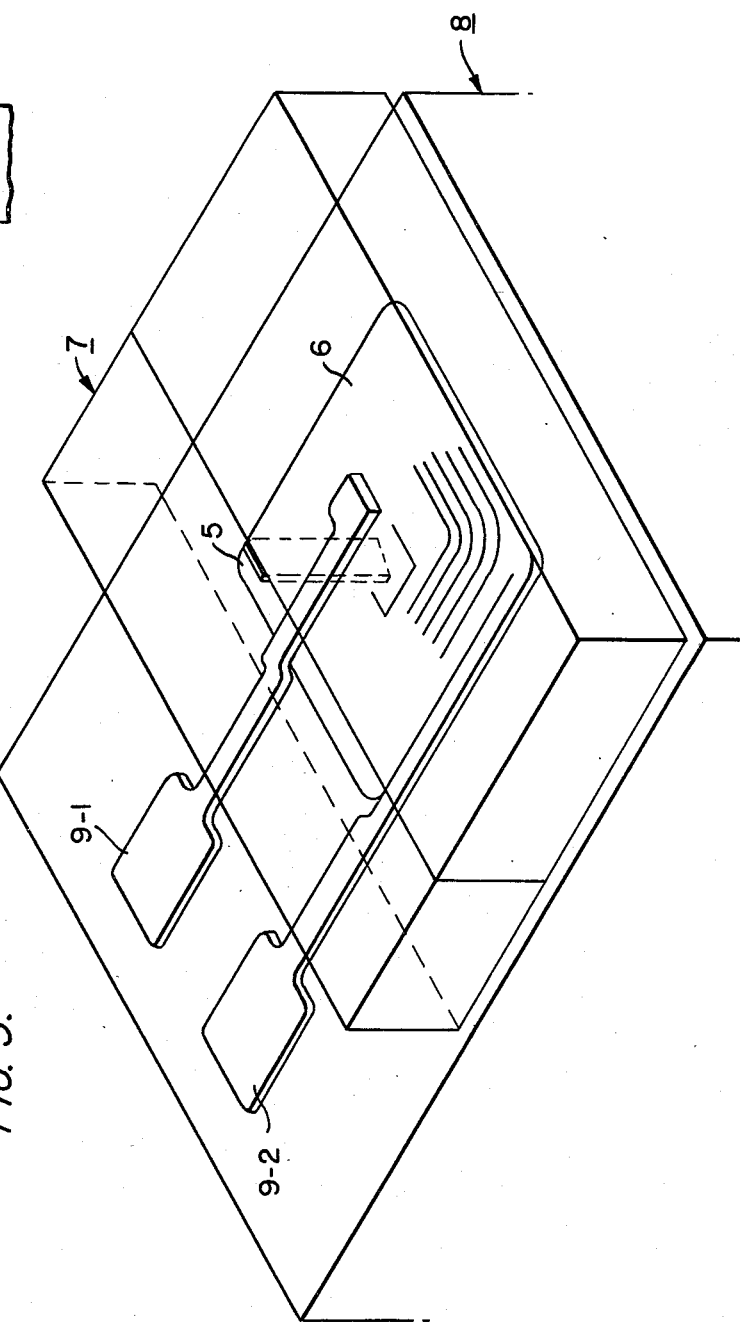
FIG. 3 is a perspective view of an embodiment of the magnetic head for perpendicular magnetic recording of the present invention.

The magnetic head for the perpendicular magnetic recording system of the present invention will be explained by referring to a first embodiment, as depicted in FIGS. 3 and 4. As best seen from FIG. 4, a main pole 5 is obtained by evaporating or sputtering or plating a ferromagnetic thin film, such as permalloy, on an edge of the insulated glass substrate 10-1. A main pole or upper block 7 can be obtained by bonding the insulated glass substrate 10-1 on which edge the main pole 5 is formed and an insulated glass substrate 10-2 with a bonding layer 11. The cross section of the main pole 5 is about 4 $\mu$m $\times$ 70 $\mu$m, while the thickness of bonding layer 11 is about 20 $\mu$m.

A ferromagnetic substrate 16 is obtained by using, for example, NiZn ferrite. A coil 6 is formed on the ferromagnetic substrate 16 by thin film technology, for example, evaporation or sputtering, and a magnetic core 14, such as permalloy, is formed on the substrate 16 in the same way at the center of the thin film coil 6. The thin film coil 6 is, for example, a laminated coil with 5$\times$2 turns, and an insulation layer 15, such as SiO$_2$, exists between the first and second layers. A conductor 13 of the thin film coil 6 is formed, for example, having a cross section of 4 $\mu$m $\times$ 30 $\mu$m. In addition, the size of the magnetic core 14 is, for example, about 12 $\mu$m $\times$ 100 $\mu$m $\times$ 100 $\mu$m. The coil or lower block 8 can be obtained by forming the thin film coil 6 and the magnetic core 14 on the ferromagnetic substrate 16. The main pole block 7 and the coil block 8 are bonded by means of a bonding layer 12. Depth d, as shown in FIG. 4, from the surface of the main pole block 7 to the thin film coil 6 is, for example, about 50 $\mu$m. 9-1 and 9-2, as shown in FIG. 3, are terminals for the thin film coil 6.

Figure 5:
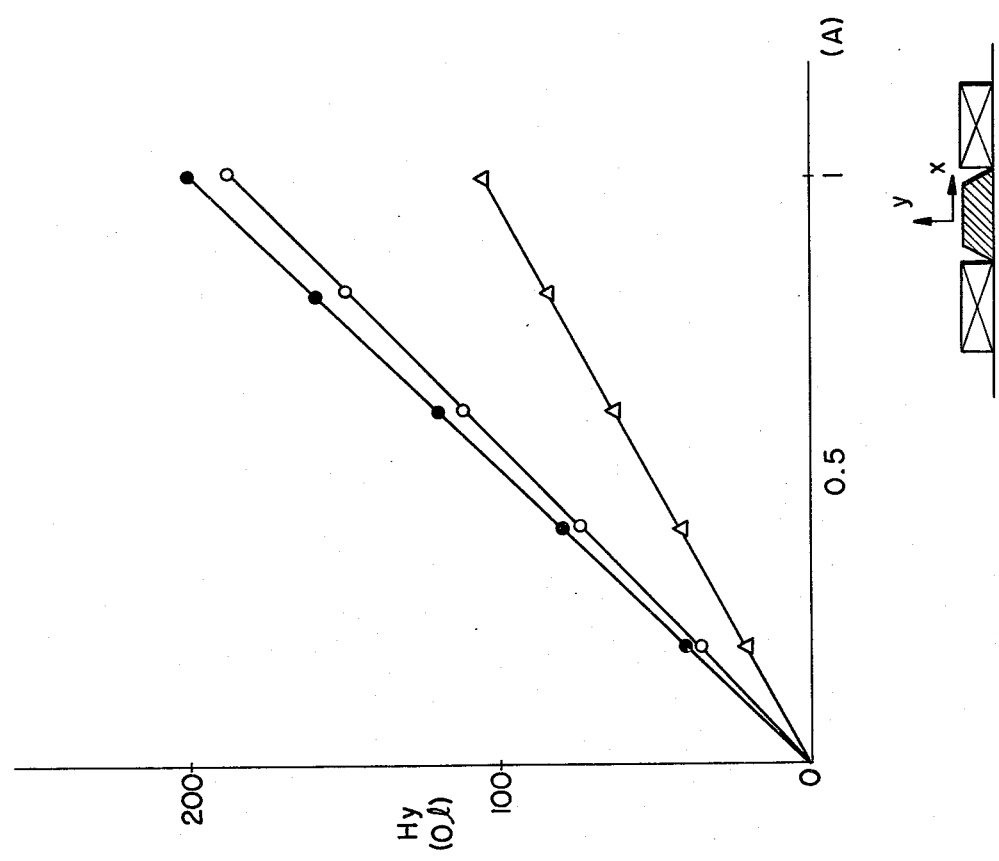
FIG. 5 shows the characteristic of magnetic field generated by a coil of the magnetic head for the perpendicular magnetic recording system of the present invention.

FIG. 5 indicates the magnetic field generation characteristic of the coil. The characteristic indicated in FIG. 5 is measured by using a model obtained by magnifying 100 times the coil indicated in FIG. 4. The coil has a winding of 180 turns and the magnetic field intensity is measured just above the center of the coil. In FIG. 5, the curve obtained by plotting the triangle marks indicates the characteristic when no ferromagnetic substrate 16 is used at the rear side of the coil, the curve obtained by plotting circles indicates the characteristic when the ferromagnetic substrate 16 is used at the rear side of the coil, and the curve obtained by plotting large dots indicates the characteristic when the ferromagnetic core 14 exists at the coil center and the ferromagnetic substrate 16 exists at the rear side. As can be seen from FIG. 5, when the ferromagnetic material exists at the rear side of the coil, an intensified magnetic field is generated, and when a magnetic core exists at the coil center, magnetic field intensity is improved by about 30%.

Figure 6:
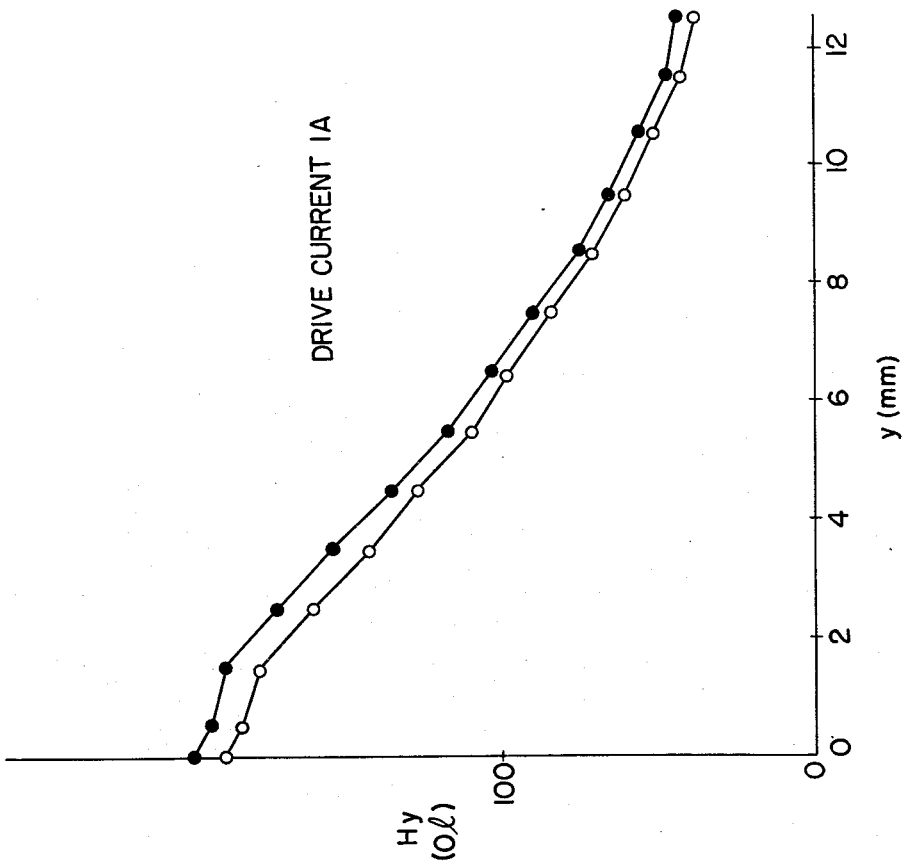
FIG. 6 shows the vertical distribution characteristic of the magnetic field of the magnetic head for the perpendicular magnetic recording system of the present invention.

FIG. 6 shows the vertical distribution characteristic of the magnetic field obtained by using the model of FIG. 5. The curves obtained by plotting circles and large dots have the same meaning as those of FIG. 5. As can be seen from FIG. 6, both the magnetic field decrease in vertical Y distribution but the magnetic field when a magnetic core exists is larger than that when a magnetic core does not exist.

The magnetic field of the coil required for saturated writing to the Co-Cr layer of the recording medium is considered about 150Oe when measured at the end of the main pole of the magnetic head. From FIG. 5, the AT (ampere turn) required for obtaining 150Oe is 220 AT at the area being apart by 5 mm from the coil surface. In the case of an actual magnetic head, the AT becomes 2.2 AT at the area being apart by 50 $\mu$m from the coil surface and when a coil of 10 turns is obtained, the saturated writing can be realized with 200 mA. The thin film coil with 10 flat turns of winding can be obtained easily and in this case the inductance is about 0.1 $\mu$H. In the conventional auxiliary pole excitation system, the a coil inductance is about 100 $\mu$H. From this fact, this invention has fantastically improved the operation speed as compared with the conventional auxiliary pole excitation system. The head of the present invention and the conventional head are compared in the following table. However, a current value indicated is necessary for generation of coil magnetic field of 150 Oe.

| Excitation system | Shape | No. of turns | Current | Inductance |
| --- | --- | --- | --- | --- |
| Auxiliary pole | 0.7 × 3 × 1.5 mm | 100 turns | 0.2 A | 100 μH |
| Main pole | 0.01 × 0.5 × 0.03 | 3 turns | 1 A | 0.001 μH |
| Present invention | 1 × 1 × 0.1 | 10 turns | 0.22 A | 0.1 μH |

As will be apparent from the above table, the present invention realizes a magnetic head for the perpendicular magnetic recording system providing only the merits of both the auxiliary pole excitation system and the main pole excitation system.

FIG. 3 and FIG. 4 show the embodiment where the coil 6 is obtained by thin film fabrication technology, but a similar characteristic can also be obtained by arranging ordinary small size winding coil.

FIG. 7 to FIG. 16 respectively show other embodiments of this invention. In these figures, 16' is a nonmagnetic substrate and 17 is a ferromagnetic thin film, layer. The same portions or elements of the magnetic head shown in FIG. 3 and FIG. 4 are given the same symbols for the embodiments shown in FIGS. 7–16.

In the embodiment of FIG. 7, a composite substrate having the ferromagnetic thin film 17 formed on the non magnetic substrate 16' is provided in place of the ferromagnetic substrate 16 used in the embodiment indicated in FIGS. 3 and 4.

In the embodiment of FIG. 8, the upper block, after bonding the glass substrate 10-1 with the main pole 5 and the glass substrate 10-2 and forming a thin film coil 6 on the glass substrates 10-1 and 10-2, and the lower block, after forming the magnetic core 14 on the ferromagnetic substrate 16, are coupled together.

In the embodiment of FIG. 9, a composite substrate having the ferromagnetic thin film 17 formed on the nonmagnetic substrate 16' is provided in place of the ferromagnetic substrate used in the embodiment of FIG. 8.

In the embodiment of FIG. 10, the upper block, after bonding the glass substrate 10-1 with the main pole 5 and the glass substrate 10-2 and forming a magnetic core 14 on the glass substrates, and the lower block, after forming a magnetic core 14 and the thin film coil 6 on the lower block head substrate, are coupled together. As the lower block head substrate, either the ferromagnetic substrate or the composite substrate as previously described may be used.

Figure 11:
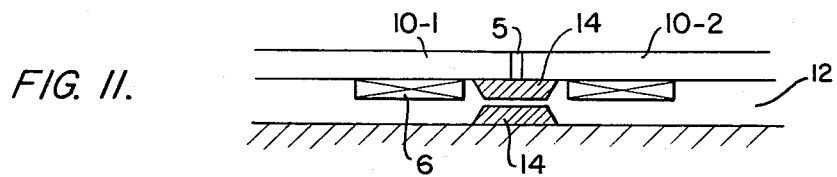
FIG. 11 shows still another embodiment of the magnetic head for the perpendicular recording system of the present invention having a magnetic core formed on a substrate opposing a magnetic core formed on the main pole substrate with the flat coils.

In the embodiment of FIG. 11, the upper block, obtained after bonding the glass substrate 10-1 with the main pole 5 and the glass substrate 10-2 and forming the thin film coil 6 and a magnetic core 14 on the substrate, and the lower block obtained by forming a magnetic core 14 on the lower block head substrates are coupled together.

Figure 12:
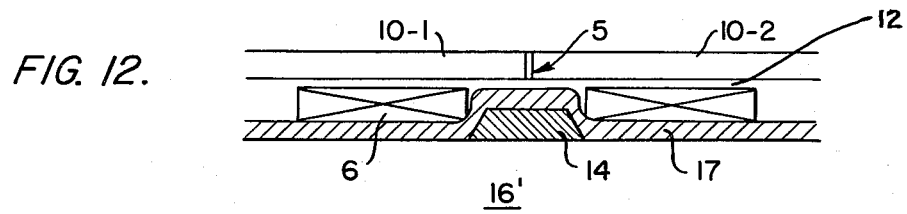
FIG. 12 shows still another embodiment of the magnetic head for the perpendicular magnetic recording system of the present invention having a composite coil substrate with a magnetic core formed on a nonmagnetic substrate and a ferromagnetic thin film formed on the nonmagnetic substrate over the magnetic core with the flat coil formed on the ferromagnetic thin film.

In the embodiment of FIG. 12, the lower block, where the coil 6 is formed on a composite substrate obained by first forming the ferromagnetic core 14 on the nonmagnetic substrate 16' and then forming the ferromagnetic, thin film 17 on the nonmagnetic substrate 16' and over the core 14 and the upper block, obtained by bonding the glass substrate 10-1 with the main pole 5 and the glass substrate 10-1 are coupled together. Ferromagnetic core 14 also may be provided on both the upper and lower blocks.

Figure 13:
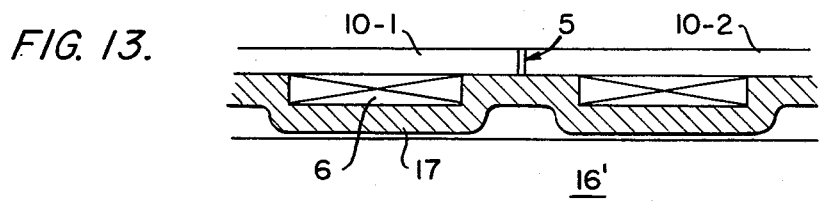
FIG. 13 shows still another embodiment of the magnetic head for the perpendicular magnetic recording system of the present invention having the flat coils formed on the main pole substrate with a ferromagnetic thin film being formed thereover.

In the embodiment of FIG. 13, in place of the ferromagnetic core 14 and ferromagnetic thin film 17 being formed on the lower block as in the embodiment of FIG. 9, the ferromagnetic thin film 17 is formed on the upper block after formation of coil 6 on substrates 10-1 and 10-2 in order to obtain the effects of both the ferromagnetic core and ferromagnetic thin film. The nonmagnetic substrate 16' may be replaced by the magnetic substrate.

Figure 14:
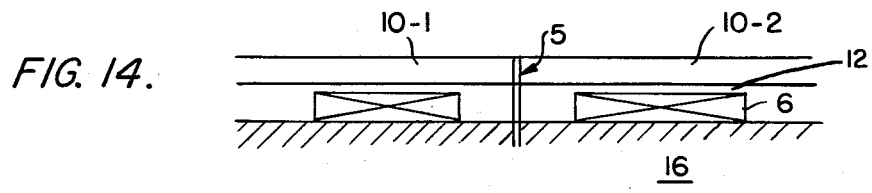
FIG. 14 shows still another embodiment of the magnetic head for the perpendicular magnetic recording system of the present invention having the main magnetic pole of the pole substrate reach the ferromagnetic substrate of the coil substrate.

In the embodiment of FIG. 14, the magnetic core 14 used in the embodiments of FIG. 7, FIG. 8 and FIG. 9 is not used and the main pole piece 5 reaches the lower block. The lower block substrate may be a magnetic substrate or nonmagnetic substrate or composite substrate of the nonmagnetic substrate and magnetic substrate.

Figure 15:
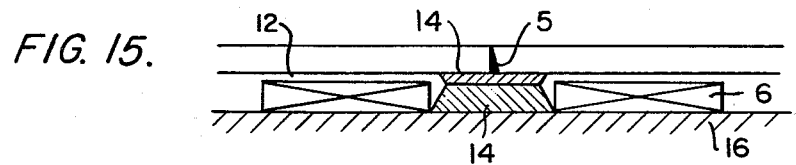
FIG. 15 shows still another embodiment of the magnetic head for the perpendicular magnetic recording system of the present invention having the main pole having a structure for focusing the magnetic flux.

In the embodiment of FIG. 15, the main pole piece 5 used in the embodiments of FIG. 1 to FIG. 14 has a magnetic flux focusing structure 6' in order to improve the characteristic. The magnetic flux focusing structure is classified into the structure for focusing the magnetic flux to the end from the point of view of the shape.

Figure 16:
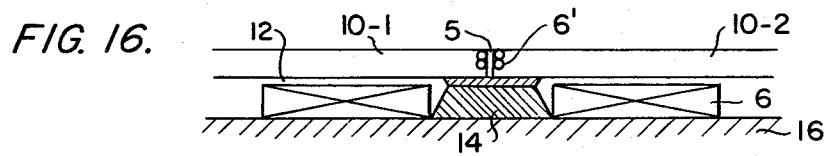
FIG. 16 shows still another embodiment of the magnetic head for the perpendicular magnetic recording system of the present invention having a coil at the end of the main pole for improving reproduction efficiency.

In the embodiment of FIG. 16, a coil 6' is arranged at the end of the main pole 5. The coil 6' is connected to the coil 6 in order to improve reproduction efficiency.

In the above embodiments, the recording/reproduction head is obtained by coupling the main pole block and the coil block, i.e., the upper block and the lower block, but the recording/reproduction head of this invention can be obtained by other methods. For example, in case of obtaining the recording/reproduction head indicated in FIG. 3 and FIG. 4, the magnetic core 14 and the thin film coil 6 are formed on the ferromagnetic substrate 16 by the ordinary evaporation method, etc., and thereon the main pole 5 may be formed by such a method as mask evaporation, etc.

As is apparent from the above explanation, the present invention offers a magnetic head for the perpendicular magnetic recording system having only the merits of recording/reproduction heads of both the conventional main pole excitation system and the auxiliary pole excitation system.

We claim:

1. A perpendicular recording magnetic head comprising:
    (a) a pole substrate member having a first surface forming a transducer face and a second surface opposite thereto, the pole substrate member being formed of first and second non-magnetic substrate portions with corresponding side edges for bonding, and a main pole of a thin ferromagnetic film formed on the side edge of said first substrate portion with the corresponding side edge of the second substrate portion bonded thereto; and
    (b) a coil substrate member having a coil substrate with a magnetic portion in contact with the main pole thin film and a flat coil formed on the surface of said coil substrate, the pole substrate member being bonded at the second surface thereof to said coil substrate member wherein the main pole thin film in the pole substrate is positioned vertically to the center of the flat coil on the coil substrate to form a single integrated perpendicular recording magnetic head.

2. A magnetic head for perpendicular magnetic recording systems in accordance with claim 1, wherein said coil substrate is a ferromagnetic substrate.

3. A magnetic head for perpendicular magnetic recording systems in accordance with claim 1, wherein said coil substrate is a composite substrate having a nonmagnetic substrate and a ferromagnetic thin film formed on the nonmagnetic substrate.

4. A magnetic head for perpendicular magnetic recording systems in accordance with claim 1, wherein a first magnetic core is arranged at the center of said coil on said coil substrate and the magnetic field generated by said coil flows through said at least one magnetic core to said main pole.

5. A magnetic head for perpendicular magnetic recording systems in accordance with claim 4, wherein the coil substrate on which said first magnetic core is arranged is a composite substrate having a nonmagnetic substrate and a ferromagnetic thin film formed on the nonmagnetic substrate and wherein said first magnetic core is arranged on the nonmagnetic substrate on which the ferromagnetic thin film is formed.

6. A magnetic head for perpendicular magnetic recording systems in accordance with claim 4, further comprising a second magnetic core arranged on said pole substrate above said first magnetic core arranged on said coil substrate.

7. A magnetic head for perpendicular magnetic recording systems in accordance with claim 6, wherein the coil substrate on which said first magnetic core is arranged is a ferromagnetic substrate.

8. A magnetic head for perpendicular magnetic recording systems in accordance with claim 6, wherein the coil substrate on which said first magnetic core is arranged is a composite substrate having a nonmagnetic substrate and a ferromagnetic thin film formed on the nonmagnetic substrate.

9. A magnetic head for perpendicular magnetic recording systems in accordance with claim 8, wherein said first magnetic core is arranged on said nonmagnetic substrate of said composite substrate and wherein said coil is formed on said ferromagnetic thin film formed on said nonmagnetic substrate of said composite substrate.

10. A magnetic head for perpendicular magnetic recording systems in accordance with claim 4, wherein the depth from the surface of said main pole to the said flat coil is approximately 50 $\mu$m.

11. A magnetic head for perpendicular magnetic recording systems in accordance with claim 10, wherein said magnetic core has a size of approximately 12 $\mu$m $\times$ 100 $\mu$m $\times$ 100 $\mu$m.

12. A magnetic head for perpendicular magnetic recording systems in accordance with claim 10 or 11, wherein said main pole piece has a cross-section of approximately 4 $\mu$m $\times$ 70 $\mu$m.

13. A magnetic head for perpendicular magnetic recording systems in accordance with claim 1, wherein said main pole has a magnetic flux focusing structure.

14. The perpendicular recording magnetic head of claim 13, wherein the thickness of the main pole film is wider at the surface of the pole substrate facing the coil substrate than the thickness of the main pole film at the surface of the pole substrate opposite the coil substrate.

15. A magnetic head for perpendicular magnetic recording systems in accordance with claim 1, further comprising a coil arranged at the end of said main pole for improving reproduction efficiency.

16. The perpendicular recording magnetic head of claim 1, wherein the thin ferromagnetic film forming the vertical main pole has a thickness of approximately 4 $\mu$m.

* * * * *